No. 878,819. PATENTED FEB. 11, 1908.
H. E. MOONEY.
INSTRUMENT FOR USE IN NAVIGATION.
APPLICATION FILED SEPT. 19, 1907.
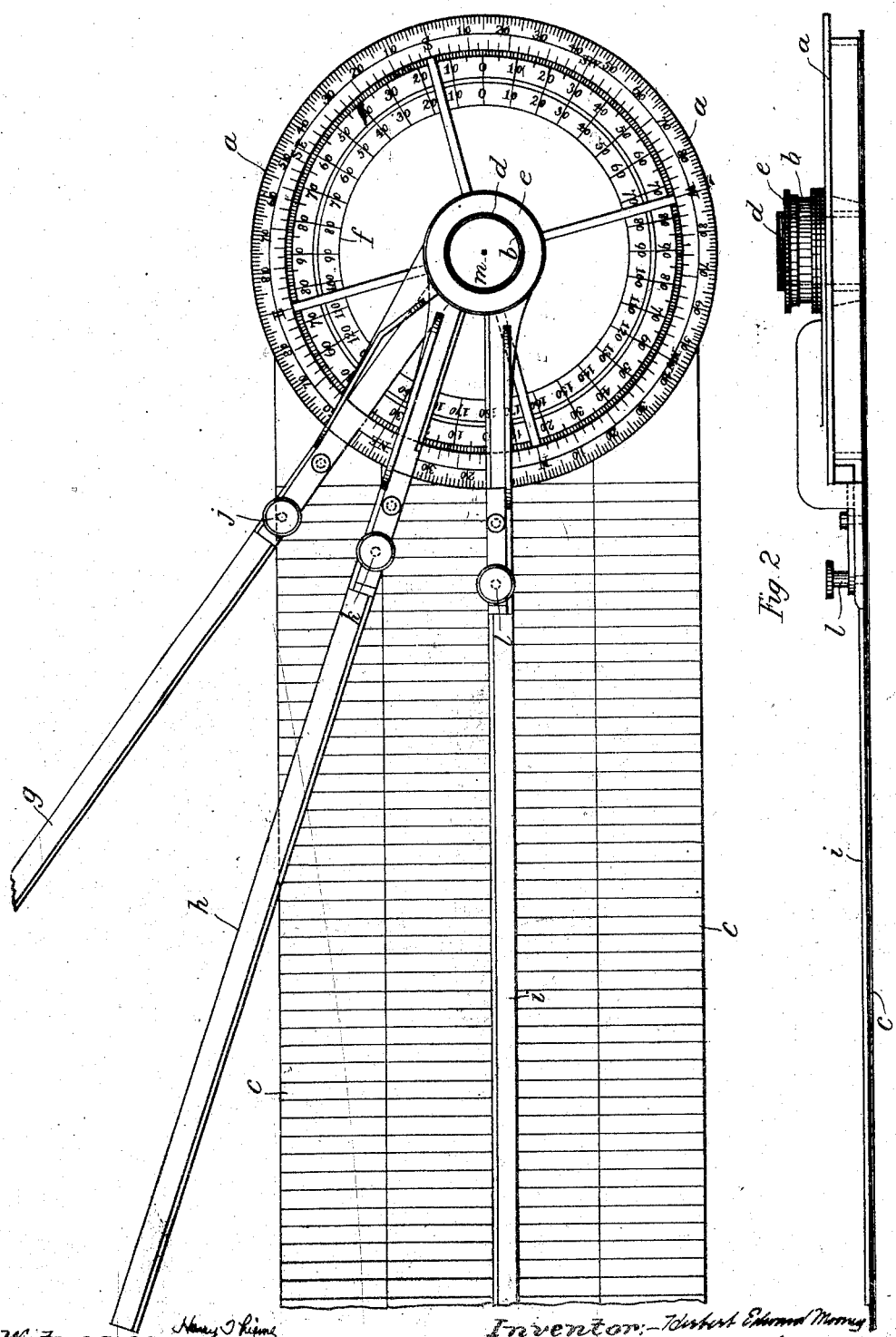

UNITED STATES PATENT OFFICE.

HERBERT EDWARD MOONEY, OF HASTINGS, ENGLAND.

INSTRUMENT FOR USE IN NAVIGATION.

No. 878,819.  Specification of Letters Patent.  Patented Feb. 11, 1908.

Application filed September 19, 1907. Serial No. 393,611.

*To all whom it may concern:*

Be it known that I, HERBERT EDWARD MOONEY, a subject of the King of Great Britain, residing at 7 St. Thomas road, Hastings, in the county of Sussex, England, merchant officer, have invented a new and useful Improved Instrument for Use in Navigation, of which the following is a specification.

In the navigation of ships it is usual to employ an instrument called a station pointer, a pair of dividers and a ruler in order to lay off the bearings of a ship on a chart.

The instrument which forms the subject of the present invention is designed to fulfil all requirements of these separate instruments with greater speed, facility and accuracy than can be attained by their use. Moreover with the aid of this instrument alone everything can be done on a chart which is required in the navigation of a ship and bearings can be laid off just as they are taken from the compass without any correction, the instrument compensating for the error of the compass.

In the accompanying drawing I have shown an instrument embodying my invention.

Figure 1 is a plan view and Fig. 2 is a side view.

$a$ is a metal ring marked with the points of the compass and with degrees arranged in the usual way of four sets of 90. Pivoted centrally of this ring to a hollow boss or hub $b$ carried by radial arms is what I term a course pointer $c$ which in the drawing is represented as a wide sheet of xylonite or similar transparent material ruled both longitudinally and transversely with straight lines.

Means are provided for clamping this pointer $c$ tightly to the ring $a$. The means shown consist of a tube $d$ screwed to the pointer $c$ and fitting snugly within the hub $b$ and a clamping ring $e$ threaded internally to screw onto the threaded end of the tube $d$.

In connection with the pointer $c$ is another graduated ring $f$ like a compass ring. This may either be separated with means for clamping it to the pointer $c$ or in one with the pointer as shown in the accompanying drawing.

$g$ $h$ and $i$ are pointers centered upon the hub $b$ and capable of revolving thereon. These pointers are provided with clamping means operated by the thumb nuts $j$ $k$ and $l$ for fixing them to the ring $a$.

The pointers $g$, $h$ and $i$ may, if desired, be made with a surface capable of receiving a pencil mark, which may be rubbed out.

To lay down on a chart the position of a ship by the aid of land-marks the navigator adjusts the ring $a$ to the ring $f$ of the pointer $c$ so as to allow for error which may be either compass error or variation according to whether the navigator used compass or magnetic bearings.

In the drawing Fig. 1 the ring $a$ is adjusted 15° west of the ring $f$ supposing that to be the error of the compass.

The bearings of the land-marks are then taken by compass and the pointers $g$ $h$ and $i$ or some one of them are set accordingly to the ring $a$ and clamped. The instrument is then laid on the chart taking care that one of the transverse lines on the pointer $c$ or one of the longitudinal lines coincides with one of the lines of latitude or longitude on the chart, respectively. The instrument is shifted about, still maintaining the pointer $c$ in the proper direction guided by the lines thereon until the beveled edges of the other pointers cut the land-marks observed which are marked on the chart.

The axis of the instrument indicated by $m$ within the hub $b$ where there may be a small hole in the xylonite will coincide with the position of the ship on the chart which can be marked by the point of a pencil through the hole $m$ in question.

When the ship's course is ruled on the chart instead of laying the pointer $c$ on the lines of latitude or longitude while the ring $a$ is adjusted to the compass course the said pointer may be laid to the ship's true course on the chart and the ring $a$ adjusted to the compass course. The bearings being compass bearings give the adjustment for the pointers $g$ $h$ or $i$ on the ring $a$ so that when the instrument is laid on the chart with the pointer $c$ laid to the true ship's course and the pointers $g$ $h$ or $i$ laid to the bearings taken, the axis $m$ will indicate the ship's position as before. With this method there is no correction necessary either on the instrument, or on paper, the correction being made when the course pointer is set on the compass course steered, as on laying the course pointer on the ship's track, the compass course and true course are one and the same line, so also are the compass bearings made true bearings and the ship's position fixed as before.

To measure the distance from the landmarks observed it will only be necessary to mark the pointers opposite the landmark on the chart lightly with a pencil and then measure off the marked portion on the side of the chart.

To lay off a latitude and longitude when the ship's position has been ascertained by observation or dead reckoning any two of the pointers $g$ $h$ and $i$ are set at right angles, one on 0 and the other on 90 of the ring $a$. The center of instrument $m$ is placed on the minutes of the degree of latitude and the pointer set 0 is marked at the point opposite the nearest parallel of latitude. This is repeated with the other pointer for longitude on the top or bottom of chart, then when the marks on the two pointers are on the parallel of latitude and meridian of longitude respectively, the center of instrument will be the desired position, which can be marked as before with a pencil dot. When the position has been found, the pointers can be utilized for finding the course steered from a previous position, and the course the navigator wishes to steer, from his present position.

Whenever three bearings are used the position can be ascertained as with the station pointer and the error of the compass can be verified with great ease.

When the pointers $g$ $h$ and $i$ are set to compass bearings on the ring $a$ and the pointer $c$ is moved to coincide with one of the lines of latitude or longitude on the chart, the ring $a$ will then show the error of the compass.

In the drawing it will be seen that the ring $f$ carries an extra graduated circle marked 0–180 in duplicate. This is a convenience when the instrument is used as a station pointer for laying off sextant angles.

What I claim and desire to secure by Letters Patent of the United States, is—

An instrument by means of which bearings and the like may be laid off on a chart without the aid of calculations or subsidiary instruments, the said instrument comprising a compass ring, pointers, means for supporting the pointers pivotally and centrally on the ring, means for separately clamping the pointers to the ring, lines marked on one of the said pointers and a second compass ring adjustable in a rotary direction with regard to the first ring simultaneously with the marked pointer.

In testimony whereof I have signed my name to this specification in the presence of two subscribing witnesses.

HERBERT EDWARD MOONEY.

Witnesses:
ALFRED S. BISHOP,
WALTER F. TANDY